Feb. 3, 1942.   J. M. CHRISTMAN   2,271,759
METHOD OF PROCESSING GEARS
Original Filed April 10, 1935   2 Sheets-Sheet 1
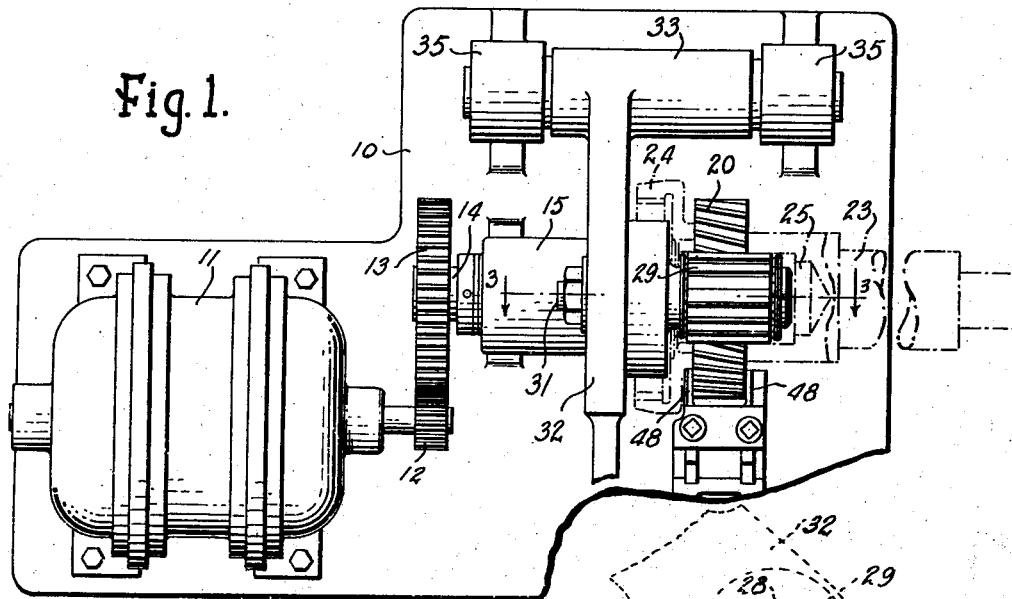
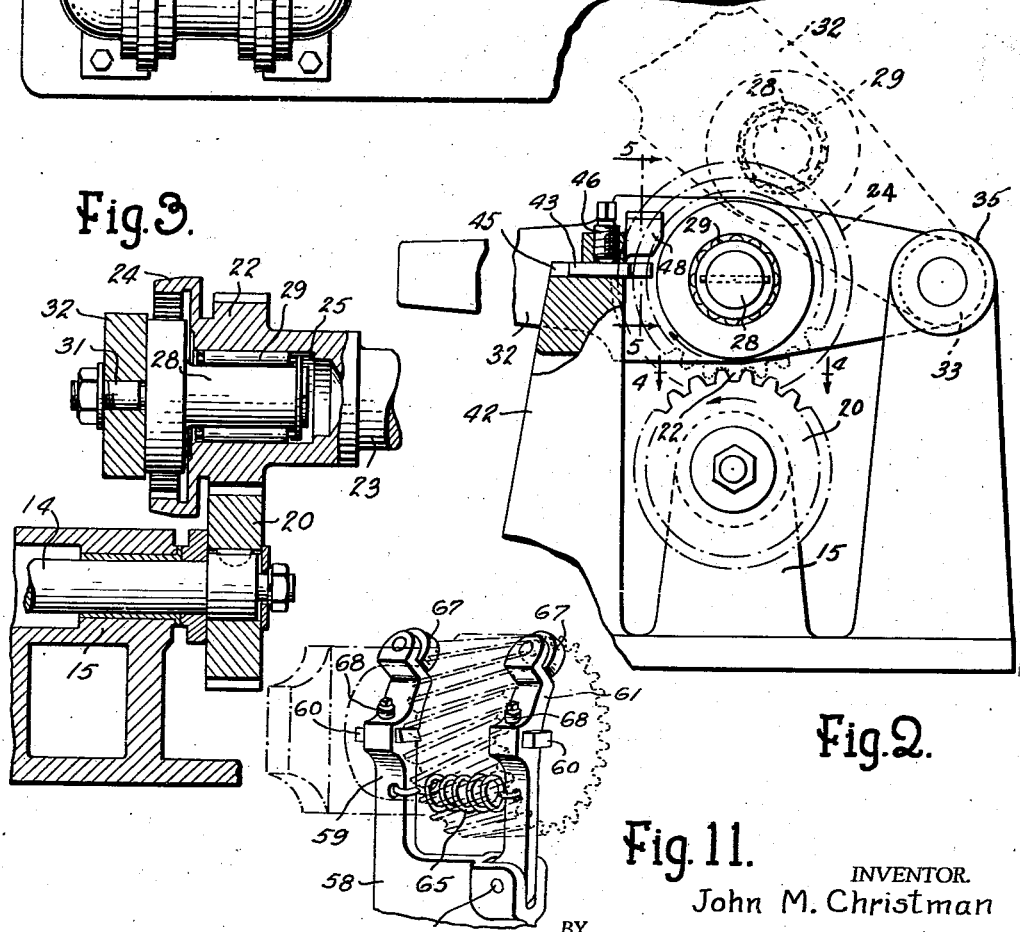
INVENTOR.
John M. Christman
BY Sibbetts & Hart
ATTORNEYS Feb. 3, 1942. J. M. CHRISTMAN 2,271,759
METHOD OF PROCESSING GEARS
Original Filed April 10, 1935 2 Sheets-Sheet 2
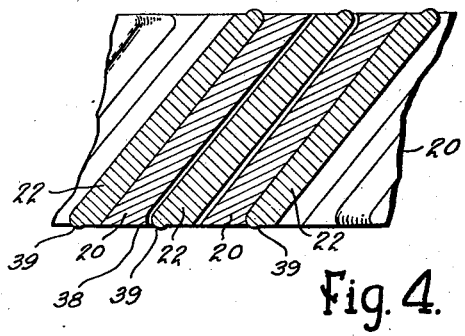
Fig. 4.
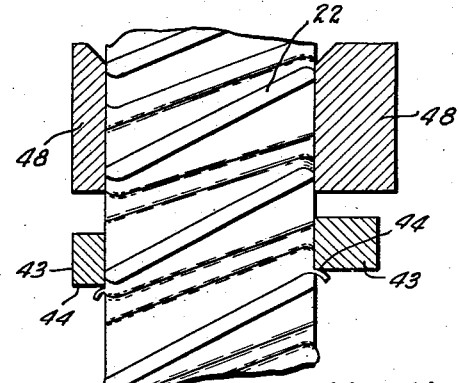
Fig. 5.
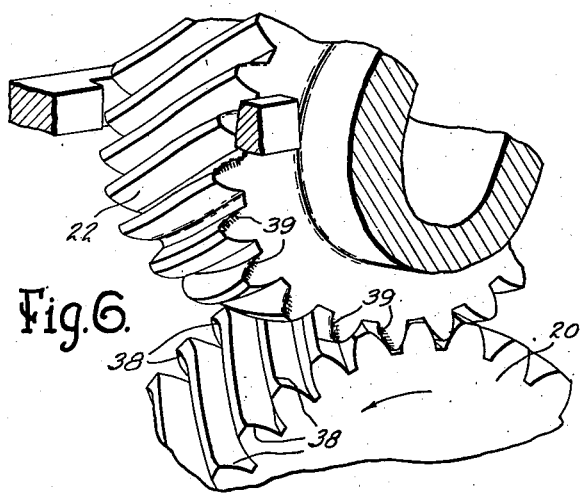
Fig. 6.
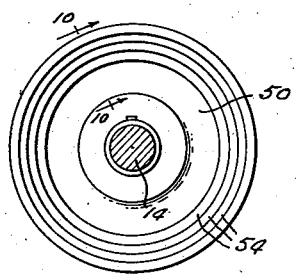
Fig. 9.
Fig. 7.
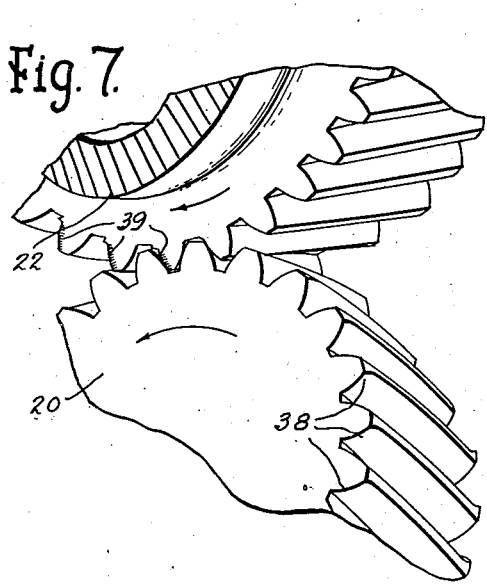
Fig. 8.
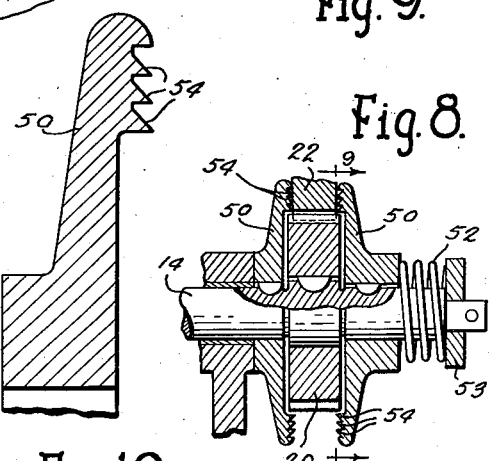
Fig. 10.
INVENTOR.
John M. Christman
BY
Sibbetts & Hart
ATTORNEYS Patented Feb. 3, 1942

2,271,759

UNITED STATES PATENT OFFICE 2,271,759

METHOD OF PROCESSING GEARS

John M. Christman, Detroit, Mich., assignor to Packard Motor Car Company, Detroit, Mich., a corporation of Michigan Original application April 10, 1935, Serial No. 15,652. Divided and this application October 25, 1939, Serial No. 301,257

3 Claims. (Cl. 29—159.2)

This invention relates to a method of processing gears and more particularly to a method of chamfering gear teeth. This application is a division of my Patent No. 2,206,450, issued July 2, 1940.

This chamfering of gears, commonly done by hand by means of a file, not only serves to prevent the breaking off during use of the gears of small particles of metal, which is obviously highly objectionable in the event the gears are used in an automobile transmission or other closed lubricated housing, but in the case of gears which are axially shiftable into and out of mesh, such as starter gears or gears employed in change speed transmissions, the meshing of the gears is facilitated by the provision of cooperating chamfered or beveled edges.

It has been heretofore proposed to provide machines for effecting the chamfering of gears to replace the hand chamfering commonly employed, but these machines rely for the most part on a cutting operation which is difficult to execute with accuracy and which is likely to leave burrs or rough edges on the teeth which are equally as objectionable as the original burrs on the freshly cut gear teeth. It is proposed by the present invention to eliminate these difficulties and to effect chamfering of the teeth by deformation of each tooth by the application of pressure thereto before the gear is hardened. If desired, the material displaced as the result of such deformation may be removed by grinding or cutting, but under some circumstances this step may be eliminated.

In a more specific aspect thereof, the invention contemplates the rolling of an unhardened gear to be chamfered with a hardened toothed element, the latter having the end portions of the teeth thereof deformed, whereby corresponding deformation of the end portions of the teeth of the unhardened gear may be effected to provide the desired chamfer.

Further objects and features of the invention will be apparent from the following description taken in connection with the accompanying drawings, in which:

Figure 1 is a plan view of one form of apparatus for chamfering gears in accordance with the invention;

Figure 2 is an end elevation, partly in section, of the apparatus shown in Figure 1;

Figure 3 is a vertical section taken substantially on the line 3—3 of Figure 1;

Figure 4 is a horizontal sectional view on the line 4—4 of Figure 2;

Figure 5 is a section taken substantially on the line 5—5 of Figure 2;

Figures 6 and 7 are perspective views illustrating the manner in which the hardened toothed element and unhardened gear cooperate to chamfer the latter;

Figure 8 is a sectional view illustrating a modified arrangement for removing displaced material from the gear teeth;

Figure 9 is a section on the line 9—9 of Figure 8;

Figure 10 is a section on the line 10—10 of Figure 9; and

Figure 11 is a perspective view illustrating a further modified form of the device for removing displaced material from the gear teeth.

For convenience in describing the invention, reference is made to the several embodiments thereof illustrated in the accompanying drawings and specific language is employed. It will nevertheless be understood that no limitation of the scope of the invention is thereby intended but that various further modifications and alterations are contemplated such as would occur to one skilled in the art to which the invention relates.

Referring first to Figures 1 to 3 of the drawings which illustrate a simple apparatus for chamfering gears in accordance with the method outlined herein, it will be observed that a base 10 serves to support a motor 11, the latter serving to rotate, by means of intermeshing gears 12 and 13, a shaft 14 which is journalled in a bearing boss 15 rising from the base 10. Keyed or otherwise secured to one end of the shaft 14 is a toothed element 20, the teeth of which are arranged to mesh with the teeth of a gear 22 to be chamfered. The gear 22 illustrated in the drawings is the end gear of a change speed transmission shaft 23, a clutch member 24 being formed on one end of the gear 22. It will be appreciated, however, that these details form no essential part of the present invention, the apparatus disclosed herein being capable of use with little or no modification in the processing of any gear, whether formed singly or in a cluster.

The gear 22 is formed to provide a cylindrical recessed portion 25 for the reception of an aligned shaft in the assembled transmission mechanism in which the gear 22 is employed, and use is made of this recessed portion to support the gear 22 in meshing relation with the toothed element 20. Thus a sinpdle 28 carrying an anti-friction bearing 29 may be received within the gear 22, the spindle 28 being secured, for instance by means of a bolt 31, to an arm 32, the arm 32 being provided with a hub portion 33 which may be journalled for rotation about an axis substantially parallel with the axes of the gear 22 and toothed element 20 by means of bearing bushings 35 carried by or formed integrally with the base 10.

To facilitate an understanding of the construction, the gear 22 is not shown in position on the bearing 29 in Figure 1 of the drawings. It will be appreciated, however, that when the arm 32 is swung upwardly about its axis of pivotal support, the gear 22 may be slipped over the bearing 29, and the arm depressed to place the gear in meshing relation with the toothed element 20 as shown in Figure 3. Any desired amount of pressure may be manually applied to the arm 32 to maintain this meshing engagement, and when the motor 11 is operated, both the toothed element 20 and the gear 22 will be rotated, the element 20 driving the gear. Alternatively, the gear 22 may be mounted on the shaft 14 and employed to drive the element 20.

The shape of the teeth on the element 20 is illustrated more particularly in Figures 4 to 7 of the drawings, and preferably conforms substantially to the shape of the teeth on the gear 22, so that the gear and element may be rotated in meshing relation with the working surfaces of the cooperating teeth partaking of substantially rolling engagement as in the case of any pair of well-designed cooperating gears. It will be observed, however, that the working faces of the teeth of the element 20 are deformed at points opposite the ends of the opposed working faces of the teeth of the gear 22 to provide generally radial protuberances 38 at one side only of each end of the tooth of the element. The element 20 is hardened by any suitable process, whereas the gear 22, or at least the toothed portion thereof, is relatively soft, the operation described herein being preferably carried out on the gear 22 after the cutting of teeth on the blank from which the gear is formed and prior to any hardening operation. Thus the protuberances 38 on the teeth of the hardened element 20 will apply pressure to and will deform the opposed portions of the working faces of the teeth of the relatively soft gear 22 as the gear and element are rolled together in meshed relation. The result of this deformation of the working faces of the teeth of the gear 22, as illustrated clearly in Figure 4 of the drawings, is to flatten the edge or arris formed by the intersection of the working faces and the ends of the gear teeth. Thus the ends of the gear teeth are in effect chamfered, the material of which the gear teeth are formed being displaced laterally or swaged over with the resultant formation of projections 39 at the ends of the gear teeth.

The protuberances 38 on the teeth of the element 20 are preferably formed by providing a gradual curve in the working face of the teeth, whereby the end edges of the opposed teeth of the gear 22 are rounded. Nevertheless the operation on the gear teeth is essentially one of flattening the end edges, it being appreciated that the rounded contour of the ends of the gear teeth upon completion of the operation is substantially flatter than is the initial sharply angled edge or arris formed by the cutting of the teeth in the blank. Obviously the protuberances 38 may be of different shape than that shown in the drawings, the relatively soft teeth of the gear 22 being swaged to the corresponding shape by the rolling operation.

Figures 6 and 7 illustrate the swaging of gear teeth of different contour, and it will be noted that in general it is preferred that the main portions of the teeth of the hardened element 20 shall have working faces of such contour as to correspond generally with the teeth of a gear designed for proper driving relation with the teeth of the gear 22, so that substantially no deformation of the main portions of the working faces of the teeth of gear 22 results from the swaging operation. Whether protuberances 38 are formed at both ends of each working face of the teeth of the element 20 will obviously depend on whether chamfering of both end edges of the opposed working faces of the teeth of the gear 22 is required. Thus in the processing of gears having spiral or twisted teeth, such as are illustrated in the drawings, it is ordinarily necessary to chamfer only the end edges formed by the intersection of working faces and end faces having an acute angular relation.

Thus it is found that these acute angled edges are more likely to be formed with an initial burr by the cutting of the teeth and are much more subject to fracture in operation than are the obtuse angled edges, and it is essential, particularly in the processing of gears for use in closed lubrication systems such as are employed in the change speed gearing of automobiles, that the breaking off of fragments of the teeth and the wearing away of any burrs formed during cutting be avoided.

In a swaging operation such as that hereinbefore described, it is frequently desirable to remove the material displaced laterally of the teeth and forming the projections 39, particularly since these projections constitute burrs in themselves which are likely to chip off and act as an abrasive, resulting in excessive wear of the cooperating working surfaces of the teeth in the assembled gear train. For this purpose an arrangement such as shown in Figures 1 to 3, and 5 of the drawings may be employed, the excess metal being preferably removed by a cutting operation.

Thus a stationary cutting device may be supported on a standard 42 rising from the base 10 of the machine, this cutting device including a pair of cutting tools 43, these tools having cutting edges 44 which are disposed at opposite sides of the gear 22 when the latter is properly meshed with the gear element 20. Each of the tools 43 may be received in a guideway 45 formed in the standard 42 for sliding movement toward and away from the gear 20, being retained in any position of adjustment by a set screw 46. Guide members 48 may project from the standard 42 toward the gear 22 to embrace the latter, each guide member 48 being arranged for engagement with the adjacent end face of the gear. By means of this construction the gear 22, when moved into meshing relation with the element 20, may be maintained against axial displacement so that the swaging and cutting operations will be properly performed. It will be observed from the direction of the arrows in Figure 2 that the teeth of the gear 22 are first swaged with the resultant formation of the upset portions or projections 39 on the ends of the teeth, these projections thereafter passing the cutting tools 44 and being thereby removed, the guide members 48 engaging the flat end faces of the gears which result from the cutting operation.

In Figures 8 to 10 inclusive of the drawings a different type of cutting mechanism for removing the projections 39 from the teeth of the gear 22 is disclosed. Thus generally circular cutting tools 50 may be mounted on the shaft 14 on either side of the hardened toothed element 20, these cutting tools being supported for rotation with the shaft 14. Preferably the element 20 and the cutting tools 50 are permitted some slight axial movement on the shaft 14, and a coil spring 52 is interposed between a collar 53 on the end of the shaft 14 and the adjacent cutting tool 50, whereby both cutting tools are urged into engagement with the end faces of the toothed element 20 and gear 22. The necessary light cutting pressure will obviously be applied to the tools 50 by the spring 52 even though gears varying in width to a considerable extent are treated and the cutting may be carried out to any desired depth.

Each of the cutting tools may be provided with cutting surfaces, for instance in the form of annular ribs 54 as shown more particularly in Figures 9 and 10, these ribs engaging the end faces of the gear 22. Thus as the teeth of the gear 22 are successively swaged over by engagement with the toothed element 20, and as they pass out of such engagement, the projections 39 which are formed on the teeth will pass successively across the cutting ribs 54 so that a substantial part or the whole of the projections 39 is removed and any burr on the end faces of the teeth of the gear 22 is eliminated. The cutting pressure is of course supplied in this form of the invention by the spring 52, this spring permitting the cutting of gears of varying width.

In Figure 11 of the drawings a further modified form of cutting mechanism is illustrated, this mechanism being supported on a member 58 rising from the base 10 of the machine. An upwardly directed arm 59, which may be formed integrally with the member 58, serves as a support for one of the cutting tools 60, the other cutting tool being carried in an upwardly directed arm 61 which is pivoted at 62 to the member 58 and which is urged toward the arm 59 by means of a coil spring 65 which acts under tension between the two arms. The extent to which the arm 61 may be moved toward the arm 59 is determined by the engagement of the rollers 67 with the end faces of the gear 22, these rollers being mounted in the arms 59 and 61 respectively. The cutting tools 60 are adjustable toward and away from the ends of the teeth of the gear 22, being retained in adjusted position by means of set screws 68.

While it is of course essential that the chamfering or swaging operation described herein be performed while the teeth of the gear being processed are unharedned, it is preferred to practice the invention by the execution of the several steps in the formation of the gear in the following manner. The teeth of the gear are first formed on a blank by a rough cutting operation, the gear being then carborized, quenched, and annealed. The chamfering operation is now carried out and when completed the gear is subjected to a finishing cutting operation or a burnishing process to form the working surfaces of the teeth to the precise contour desired, after which the gear is hardened by any conventional method.

It will be apparent from the foregoing description that the invention contemplates the flattening or chamfering of gear teeth by a method which is extremely simple to perform and which can be carried out by the use of inexpensive and easily operated mechanism. Since only a relatively few revolutions of the gear and cooperating toothed element are required to complete the swaging, the process is extremely rapid, particularly when compared with hand filing methods which are in common use even at the present time. In the event a very decided chamfer is required on the ends of the gear teeth, for instance to facilitate the meshing of axially slidable gears, pressure may be gradually applied to effect meshing of the gear and the hardened toothed element, the cooperating teeth moving into deeper engagement as the swaging of the gear teeth progresses. In any event, the gear and the hardened element are supported against relative axial displacement, the operation being effected by relative radial displacement of the gear and element.

Having thus described the invention, what is claimed as new and desired to be secured by Letters Patent is:

1. The method of chamfering the teeth of a work gear comprising meshing an unhardened work gear with a hardened tool gear having teeth with protuberances on end portions of their working faces, rotating the meshing gears in fixed axial relationship, and reducing the distance between the axes of the rotating meshing gears until a suitable depth of metal is displaced from the end portions of the working faces of the work gear by the protuberances on the tool gear teeth.

2. The method of chamfering the ends of work gear teeth comprising meshing a work gear with a tool gear having teeth with protuberances on end portions of working faces, rotating the meshing gears in fixed axial relationship, shifting the axis of the work gear toward that of the tool gear during the rotation until the protuberances displace metal from the work gear teeth, and shearing off the displaced metal projecting beyond the ends of the work gear teeth.

3. The method of chamfering the ends of work gear teeth comprising meshing a work gear with a harder tool gear having teeth with protuberances on end portions of their working faces, rotating the meshing gears, reducing the distance between the axes of the rotating meshing gears until metal flows from the end portions of the work gear teeth contacted by the work gear protuberances, and cutting off the metal flowing beyond the ends of the work gear teeth during the meshing rotation of the gears.

JOHN M. CHRISTMAN.